(12) United States Patent
Garman et al.

(10) Patent No.: US 11,521,139 B2
(45) Date of Patent: Dec. 6, 2022

(54) PROVIDING SYSTEM RESOURCES WITH SECURE CONTAINMENT UNITS

(71) Applicants: Matthew S. Garman, Seattle, WA (US); James R. Hamilton, Seattle, WA (US); William T. Shelton, Seattle, WA (US); Michael P. Czamara, Seattle, WA (US); Terrance Douglas Hanold, Seattle, WA (US); Abhinav Agrawal, Seattle, WA (US); John W. Eichelberg, Spokane, WA (US); Rajesh Viswanathan, Woodinville, WA (US)

(72) Inventors: Matthew S. Garman, Seattle, WA (US); James R. Hamilton, Seattle, WA (US); William T. Shelton, Seattle, WA (US); Michael P. Czamara, Seattle, WA (US); Terrance Douglas Hanold, Seattle, WA (US); Abhinav Agrawal, Seattle, WA (US); John W. Eichelberg, Spokane, WA (US); Rajesh Viswanathan, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1015 days.

(21) Appl. No.: 13/625,507

(22) Filed: Sep. 24, 2012

(65) Prior Publication Data
US 2014/0088979 A1     Mar. 27, 2014

(51) Int. Cl.
*G06Q 10/06*     (2012.01)
*G06F 21/86*     (2013.01)

(52) U.S. Cl.
CPC ......... *G06Q 10/0631* (2013.01); *G06F 21/86* (2013.01)

(58) Field of Classification Search
CPC ........ G06Q 10/00; G06Q 10/06; G06Q 10/08; G06Q 10/087; G06Q 10/0875; G06Q 50/10; G06Q 50/28; G06Q 10/0631; G06F 21/86
See application file for complete search history.

(56) References Cited

U.S. PATENT DOCUMENTS 5,996,013 A    11/1999   Delp et al.
6,364,439 B1 *   4/2002   Cedillo ..................... 312/223.6
(Continued)

FOREIGN PATENT DOCUMENTS

EP        1806703 A2 *   7/2007     ......... G07C 9/00309
JP        2002295083     10/2002
JP        2011172194     9/2011

OTHER PUBLICATIONS

Foster, Y. Zhao, I. Raicu and S. Lu, "Cloud Computing and Grid Computing 360-Degree Compared," 2008 Grid Computing Environments Workshop, Austin, TX, 2008, pp. 1-10, (Year: 2008).*

(Continued)

*Primary Examiner* — Gerardo Araque, Jr.
(74) *Attorney, Agent, or Firm* — Alexander A. Knapp; Kowert, Hood, Munyon, Rankin & Goetzel, P.C.

(57) ABSTRACT

A system for providing resources to customers includes racks, sub-rack level secure containment units in the racks, and a provisioning control system. The sub-rack level secure containment units each enclose system resources. The racks hold two or more of the sub-rack level secure containment units. For each customer, the provisioning control system may provision a set of sub-rack level secure containment units to the customer. The provisioning control system may monitor, and create a record of, events of physical access to the system resources in each customer's set of sub-rack level secure containment units.

27 Claims, 10 Drawing Sheets

(56) References Cited

U.S. PATENT DOCUMENTS

| | | | |
|---|---|---|---|
| 6,968,323 B1 | 11/2005 | Bansal et al. | |
| 7,167,987 B2* | 1/2007 | Angelo | 713/186 |
| 7,286,158 B1* | 10/2007 | Griebenow | G07C 9/00103 |
| | | | 340/505 |
| 7,433,311 B1 | 10/2008 | Kalyanasundaram et al. | |
| 7,610,225 B2 | 10/2009 | O'Neill | |
| 8,214,653 B1* | 7/2012 | Marr | G06F 21/629 |
| | | | 713/150 |
| 8,381,264 B1* | 2/2013 | Corddry | H04L 67/125 |
| | | | 726/3 |
| 8,473,615 B1 | 6/2013 | Rowland et al. | |
| 8,484,355 B1 | 7/2013 | Lochhead et al. | |
| 8,495,611 B2 | 7/2013 | McCarthy et al. | |
| 8,528,101 B1 | 9/2013 | Miller et al. | |
| 8,601,170 B1* | 12/2013 | Marr | G06F 21/57 |
| | | | 710/22 |
| 9,395,974 B1* | 7/2016 | Eichelberg | G06F 8/65 |
| 10,120,725 B2* | 11/2018 | Jubran | G06Q 10/087 |
| 2003/0046553 A1 | 3/2003 | Angelo | |
| 2003/0145218 A1 | 7/2003 | Hutchison | |
| 2004/0221038 A1 | 11/2004 | Clarke, Jr. et al. | |
| 2005/0066200 A1 | 3/2005 | Bahl et al. | |
| 2005/0131993 A1 | 6/2005 | Fatula | |
| 2005/0138406 A1 | 6/2005 | Cox | |
| 2006/0190602 A1 | 8/2006 | Canali et al. | |
| 2006/0212334 A1 | 9/2006 | Jackson | |
| 2007/0067435 A1 | 3/2007 | Landis et al. | |
| 2007/0201361 A1 | 8/2007 | Kumar et al. | |
| 2008/0091701 A1* | 4/2008 | Gujarathi et al. | 707/102 |
| 2008/0134177 A1 | 6/2008 | Fitzgerald et al. | |
| 2009/0044265 A1 | 2/2009 | Ghosh et al. | |
| 2009/0157870 A1 | 6/2009 | Nakadai | |
| 2009/0164356 A1 | 6/2009 | Bakman | |
| 2009/0271324 A1 | 10/2009 | Jandhyala et al. | |
| 2009/0271472 A1 | 10/2009 | Scheitler et al. | |
| 2009/0276771 A1 | 11/2009 | Nickolov et al. | |
| 2010/0036957 A1 | 2/2010 | Patel et al. | |
| 2010/0144363 A1 | 6/2010 | De Rosa et al. | |
| 2010/0192212 A1 | 7/2010 | Raleigh | |
| 2010/0211669 A1 | 8/2010 | Dalgas et al. | |
| 2010/0223364 A1 | 9/2010 | Wei | |
| 2010/0223383 A1 | 9/2010 | Salevan et al. | |
| 2010/0268827 A1 | 10/2010 | Sheets et al. | |
| 2011/0055034 A1 | 3/2011 | Ferris et al. | |
| 2011/0055844 A1 | 3/2011 | Nguyen et al. | |
| 2011/0072506 A1 | 3/2011 | Law et al. | |
| 2011/0119104 A1 | 5/2011 | Levine et al. | |
| 2011/0126275 A1 | 5/2011 | Anderson et al. | |
| 2011/0145292 A1 | 6/2011 | Lillie et al. | |
| 2011/0252420 A1 | 10/2011 | Tung et al. | |
| 2011/0295727 A1 | 12/2011 | Ferris et al. | |
| 2011/0302415 A1 | 12/2011 | Ahmad et al. | |
| 2011/0310757 A1 | 12/2011 | Yokoyama et al. | |
| 2012/0005344 A1 | 1/2012 | Kolin et al. | |
| 2012/0084113 A1 | 4/2012 | Brandwine et al. | |
| 2012/0084443 A1 | 4/2012 | Theimer et al. | |
| 2012/0095926 A1* | 4/2012 | Nishimura et al. | 705/301 |
| 2012/0133510 A1 | 5/2012 | Pierce et al. | |
| 2013/0297722 A1 | 11/2013 | Wright et al. | |
| 2013/0346899 A1* | 12/2013 | Cole | G06F 3/0482 |
| | | | 715/810 |
| 2014/0032637 A1* | 1/2014 | Weir | G01R 31/2834 |
| | | | 709/203 |

OTHER PUBLICATIONS

Knorr et al. "What Cloud Computing Really Means", Apr. 7, 2008, The New York Times, https://archive.nytimes.com/www.nytimes.com/idg/IDG_002570DE00740E180025742400363509.html (Year: 2008).*

K. Marko, "Storage Innovation," InformationWeek, pp. 12, Jul. 23, 2012 (Year: 2012).*

T. Trainer, "Clouds Cannot Be Contained In A Box," Network Computing—Online, pp. n/a, Nov. 28, 2011 (Year: 2011).*

T. Engstrom, "Business exclusive: Servers protect, support clients," The News Press, pp. n/a, Jan. 12, 2012. (Year: 2012).*

International Search Report and Written Opinion for PCT/US13/61439, dated Apr. 22, 2014, Amazon Technologies, pp. 1-14.

Extended European Search Report from Application No. 13839872.2-1955 / 2898577, PCT/US2013061439, dated Mar. 10, 2016, Amazon Technologies, Inc., pp. 1-9.

* cited by examiner

| | Report Date: 2/7/2011 12:32:04PM Pacific Star |
|---|---|

DataCntr2-1.2.05-EQUIPMENT STORAGE

| Date/Time | Event | Details | Cardholder Name |
|---|---|---|---|
| 1/26/2011 | | | |
| 3:35:23PM | Access Granted | 579355 | Doe, John |

1 Events on reader DataCntr2-1.2.05-EQUIPMENT STORAGE

DataCntr2-1.2.06-MECHANICAL RM A

| Date/Time | Event | Details | Cardholder Name |
|---|---|---|---|
| 1/26/2011 | | | |
| 3:24:23PM | Access Granted | 579355 | Doe, John |

1 Events on reader DataCntr2-1.2.06-MECHANICAL RM A

DataCntr2-1.3.03-POD 2 DBL IN

| Date/Time | Event | Details | Cardholder Name |
|---|---|---|---|
| 1/27/2011 | | | |
| 10:02:27PM | Access Granted | 579355 | Doe, John |

1 Events on reader DataCntr2-1.3.03-POD 2 DBL IN

FIG. 9

| Date Time | Rack ID | Instance IDs | Event | Details | Employee ID |
|---|---|---|---|---|---|
| 2/10/2011 3:35:23PM | 272215 | i-0fcbd365, i-0fcbd235, i-0fcbs355, i-0fcwp765, | Access Granted IN | Ticket #39828 ISSUE TYPE: Disk replacement on rack #13. | 156486 |
| 2/10/2011 3:55:23PM | 272215 | i-0fcbd365, i-0fcbd235, i-0fcbs355, i-0fcwp765, | Access Granted OUT | Ticket #39828 ISSUE TYPE: Disk replacement on rack #12. | 156486 |
| 2/10/2011 5:45:20PM | 763332 | i-1fpbd385, i-1fcrd235 | ACCESS DENIED | No ticket available. | 148325 |

FIG. 10

PROVIDING SYSTEM RESOURCES WITH SECURE CONTAINMENT UNITS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

Web Services

The conventional Web model allows clients to access Web resources (e.g., applications, services, and data) via an HTTP client program, such as a Web browser. A technology referred to as Web services has been developed to provide programmatic access to Web resources. Web services may be used to provide programmatic access to Web resources including technology platforms (e.g., applications and services) and data (e.g., product catalogs and other databases) hosted on Web-connected computers such as Web server systems via a Web service interface. Generally speaking, a Web service interface may be configured to provide a standard, cross-platform API (Application Programming Interface) for communication between a client requesting some service to be performed and the service provider. In some implementations, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

Customers who receive computing services from an outside service provider, such as a co-location operator, may wish to ensure that unauthorized persons cannot tamper with the customer's data or impair the customer's computing operations. To address these concerns, some co-location facilities isolate some customer's rack computing systems by operating the rack computing systems in a cage. Such cages may take up more space in the facility than a customer needs at a given time, however. In addition, a customer may outgrow the space within the cage, which may require building of a new cage to secure additional rack computing systems. Enclosing all of a customer's computing resources in a large cage may also make a customer vulnerable to security threats at a single point of attack. For example, one malefactor may be able to disrupt a significant amount of computing services, or steal or destroy a significant amount of the customer's data, by accessing a single entry point.

BRIEF DESCRIPTION OF THE DRAWINGS

FIG. 9 illustrates an example of an audit report for access to computing devices in secure containment units.

FIG. 10 illustrates an example of a report to a customer showing access to the customer's computing devices in secure containment units.

Figure 1:
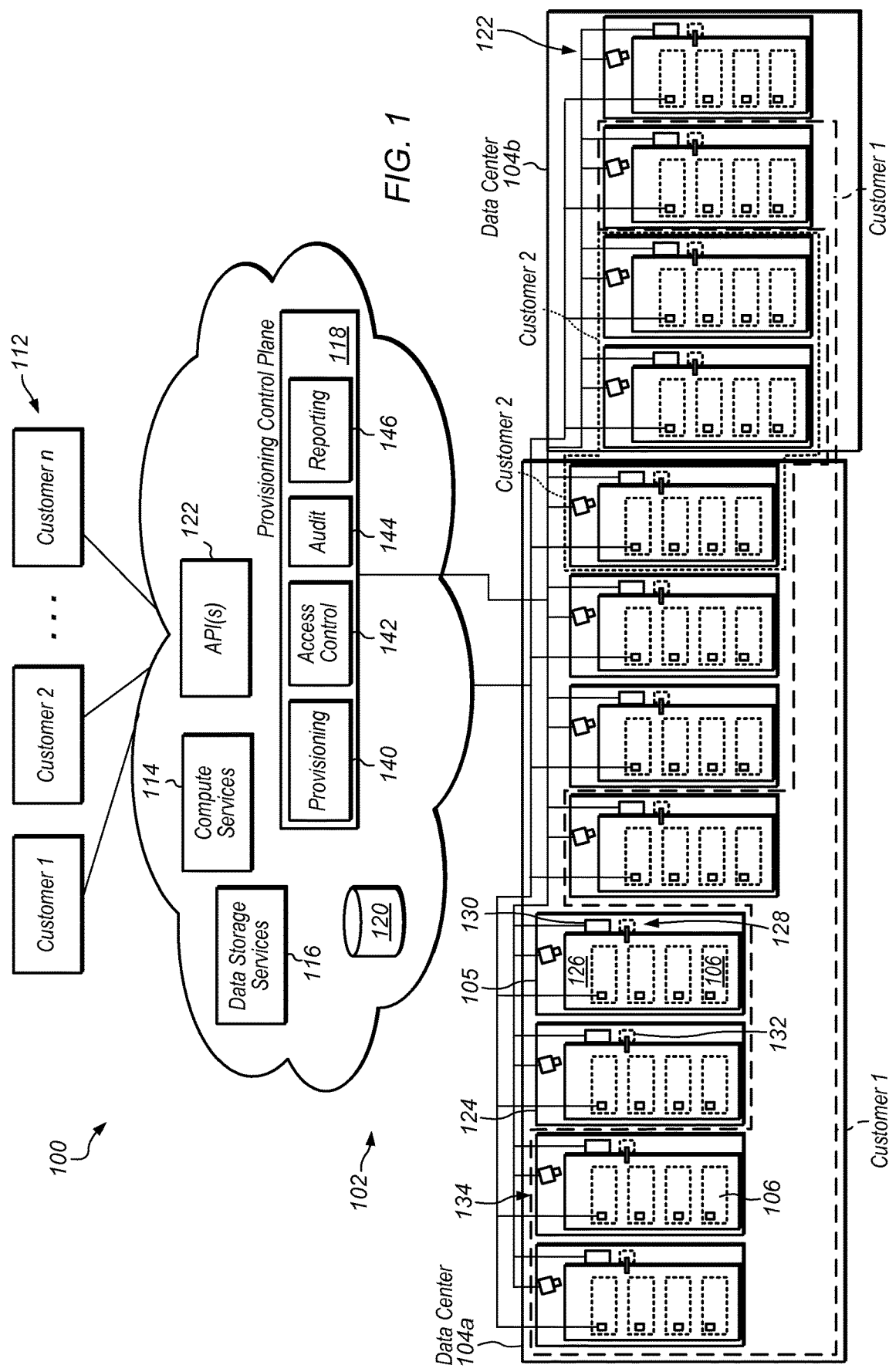
FIG. 1 illustrates one embodiment of a computing system that can be used to provide cloud services to customers using secure containment units.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of systems and methods for providing resources, such as compute resources, to customers are disclosed.

According to one embodiment, a system for providing resources to customers includes racks, sub-rack level secure containment units in the racks, and a provisioning control system. The sub-rack level secure containment units each enclose system resources. The racks hold two or more of the sub-rack level secure containment units. For each customer, the provisioning control system provisions a set of sub-rack level secure containment units to the customer. System resources may be provisioned to a customer in a set of secure containment units in response to the customer's request for restricted physical access to the customer's system resources (for example, via an API call). Each rack may include sub-rack level secure containment units for two or more customers. Each customer's set of secure containment units may include secure containment units in two or more racks. For each customer, the provisioning control system may monitor, and create a record of, events of physical access to the system resources in the customer's set of sub-rack level secure containment units. In some embodiments, the provisioning control system controls access to a customer's set of secure containment units by operating locks on the secure containment units. The locks may be operated based on access criteria provided by the customer. The customer may specify, for example, who can access system resources in its secure containment units, when they can be accessed, and for what purpose.

According to one embodiment, a system for providing resources to customers includes racks, secure containment units, and a provisioning control system. The secure containment units each enclose system resources. For each customer, the provisioning control system provisions a set of secure containment units to the customer. At least one of the one or more secure containment units in the set of secure containment units is in a different rack than at least one of other of the secure containment units in the set. The provisioning control system can monitors, and creates a record of, events of physical access to the computing resources in each customer's set of sub-rack level secure containment units.

According to one embodiment, a method of providing resources to customers includes provisioning, to each of two or more customers, a set of secure containment units each containing system resources. Access to the system resources in the set of secure containment units for each customer may be monitored, controlled, or both.

According to one embodiment, a system for controlling access to resources includes secure containment units in one or more racks in a data center, and a secure containment unit access control system. The secure containment unit access control system includes a processor and a memory coupled to the processor. The processor may store program instructions executable by the processor to implement: for each customer, monitoring access to system resources in the secure containment units; and controlling access to the system resources in the secure containment units.

As used herein, a "lock" means a device, element, system, or combination thereof, that requires an action to allow access to one or more resources. In some cases, a lock is released by applying or using a physical object to the lock, such as a key or lock. In some cases, a lock is released using biometric data. Examples of locks include key locks, electronic locking devices, magnetic locks, keypad lock systems, solenoid locking mechanisms, padlocks.

As used herein, to "provision" means to make a resource, asset, or system available for use for or by a person or entity, such as a cloud services customer. In some cases, provisioning includes allocating a resource, asset, or system to a person or entity for that person's or entity's exclusive use or benefit. For example, a computing device in secure containment unit may be controlled such that the computing device can only be used for the benefit of a particular customer.

As used herein, a "secure containment unit" means an element, system, or combination thereof, that physically contains hardware resources (such as servers) such that a separate action is required to access the hardware resources from that required to access other hardware resources. A secure containment unit may include a cage, box, rails, wire mesh, walls, or other elements to achieve containment. A secure containment unit may include a lock.

As used herein, a "sub-rack level" means a level that includes or occupies less than an entire rack. A sub-rack level secure containment unit in a rack, for example, allows for installation of one or more additional sub-rack level secure containment units in the same rack. A sub-rack level secure containment unit may contain a single computing device, or more than one computing device.

As used herein, a "system resource" includes any hardware, device, system, software, firmware, or combination thereof, that can be used, either alone or in combination with other resources, to perform operations (such as computing operations, data storage operations) or provide services. Examples of system resources include compute resources, data storage resources, network resources, electrical systems, computing devices, data storage devices, rack-mounted servers, network control devices, power supply units, telecommunication equipment, cables, and electrical power system components.

As used herein, "computing" includes any operations that can be performed by a computer, such as computation, data storage, data retrieval, or communications.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to, a server, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, testing, simulations, power distribution and control, and operational control.

As used herein, a "rack" means a rack, container, frame, or other element or combination of elements that can contain or physically support one or more computing devices.

In various embodiments, secure containment units are used to provide system resources, such as compute resources and data storage resources, to customers. Secure containment units are made, in some embodiments, by compartmentalizing racks such that physical barrier exists between each compartment. The compartments may include doors and physical locks on the doors. The locks may receive control signals (for example, to lock or unlock the secure containment unit). The signals may be transmitted, for example, over IP. Within each of the compartments, hardware may be dedicated to a single customer. For example, a security containment unit may include one computing device that is dedicated for use to perform computing operations for a particular customer. The secure containment units may be unlocked when one or more conditions are met (for example, a data tech seeking to repair or replace a computing device has been authenticated).

In some embodiments, secure containment units are provided at a sub-rack level of granularity. Each secure containment unit may be dedicated to, and isolates resources for particular customer. A collection of secure containment units with a customer's dedicated system resources may serve as a logical cage for the customer's system resources. A software control plane may keep track of what system resources are provided for each customer, and where the customer's system resources are located.

FIG. 1 illustrates one embodiment of a computing system that can be used to provide cloud services to customers using secure containment units. System 100 includes cloud computing system 102 and data center 104. Cloud computing system 102 accessed computing devices 106 in racks 108 within data centers 104a and 104b. Cloud computing system 102 control computing devices 106 to provide cloud services to customers via customer systems 112. Computing devices 106 may be, for example, servers.

Various system architectures may be employed in cloud computing system 102. Systems and components of cloud computing system 102 may be at a single physical location, such as a data center, or distributed among any number of locations. Cloud computing system 102 includes compute services 114, data storage services 116, and provisional control plane 118. Compute services 114 may access cloud data storage 120. Customer access may be accomplished by way of Application Program Interfaces (APIs) 122. Although data center 104 is shown as a separate element from cloud computing system 102 for illustrative purposes, data center 104 may be part of cloud computing system 102.

Rack systems 105 are arranged in rows 122. Each of rack systems 105 include doors rack enclosures 124, rack doors 126, a lock systems 128. Rack systems 105 and computing devices 106 may form secure containment units 134. Rack enclosures 124, rack doors 126, and lock systems 128 may be used in combination, for example, to limit access to computing devices 106 in rack enclosures 124.

Lock control device 132 may be operated to control lock mechanism 130. Lock mechanism 130 may be, for example, a solenoid locking mechanism. In some embodiments, lock control device 132 is to open or close lock mechanism 130 from a remote location.

Provisioning control plane 118 includes provisioning module 140, access control module 142, audit module 144, and reporting module 146. Provisioning module 146 may provision computing resources within data center 104 to customers using cloud computing system 102. For example, in FIG. 1, two of rack systems 104 in the left-most row 122, and one of the rack systems 104 in each of the other two rows 122 of racks are provisioned to Customer 1. One of rack systems 104 in the left-most row 122, and two of the rack systems 104 in the center of rows 122 of rack systems 104 are provisioned to Customer 2.

Access control module 142 may monitor and control access to computing devices 104 in secure containment units 134. Access control module 142 may, for example, control lock systems 128 to ensure that only authorized personnel access computing devices 106 in each of rack systems 104. Access control module 142 may, for example, receive signals from maintenance personnel at one of rack systems 104 entered via a keypad in lock control device 132. Based on the signal from the keypad, access control module 142 may return a signal that triggers the release of the corresponding lock mechanism 130. Access control module 142 may compile records of access to any of computing devices 104.

In some embodiments, a control system issues commands to release a lock for a secure containment unit based on specific conditions being met. In certain embodiments, the conditions may be based on customer-defined access criteria. For example, a customer may provide, via a network, input to a control system requiring that physical access to the secure containment units in the customer's set of secure containment units may only occur at certain times of day, on certain days of the week, or both. Examples of conditions for enabling access include one, or a combination two or more of, the following:

Authentication of the user

Authorization of the user to perform a requested action

Validation that the access is required for one of the infrastructure resources in a secure containment unit by looking for an open ticket in a trouble ticketing/remedy system Validation that a customer-specified time window for resource access is respected (for example, a particular customer may allow service to its computing resources only at certain times of day, or only on certain days of the week)

In certain embodiments, a system implements a workflow process in which access sought by a user is gated by an approval from the customer, before access is granted.

In some embodiments, each physical access to computing devices in a secure containment unit is logged. Video cameras (such as cameras 160) may be turned on when predetermined conditions are met. In some embodiments, video logs are stored and associated (for example, linked) with corresponding access records. Logs may be delivered to the customer periodically or on-demand. The log may represent each access to the hardware infrastructure dedicated to the customer. Logs may also include the identity of the person who accessed the system, when it was accessed, and why it was accessed. Logs may be processed to remove personally identifiable information (for example, before being sent to a customer).

Audit module 144 may use data relating to access to various computing devices 104 to audit access. An audit may determine, for example, whether access to any of the computing devices during a particular time period was unauthorized. An audit may be done on a customer-by-customer basis. For example, an audit may be performed for a particular one of the customers, such as Customer 1.

Reporting module 146 may create reports about provisioning, use, and access to computing devices 104. Reports may be generated on a customer-by-customer basis. For example, a report may be sent to Customer 1 including a record for every event in which one of the computing devices 104 allocated to Customer 1 was accessed. Customers may elect to receive reports on a periodic basis, an on-demand basis, or both.

System 100 includes cameras 160. Cameras 160 may monitor and record information about access to computing devices 104. In some embodiments, a camera records each event in which one or more of the computing devices in a data center is accessed. Data acquired using cameras 160 may be used for access control, auditing, and reporting. In one embodiment, a video verification of personnel is performed before access to a customer's computing devices is enabled.

In some embodiments, cameras 160 are included in a video surveillance system. Cameras 160 may include closed circuit television cameras, wireless cameras, or a combination thereof. Closed circuit television cameras and wireless cameras may be connected to a network video recorder, for example, by way of network switch.

Cameras 160 may be placed at various locations at the site. Cameras may be any of various types, including closed circuit television ("CCTV"), internet protocol ("IP") camera, wireless IP camera, analog camera, pan-tilt-zoom camera, or dome camera. Locations for cameras 160 may be selected to ensure a video record of access to one of the rack systems 104. In certain embodiments, cameras 160 are security cameras. Cameras 160 may acquire moving video, still images, or a combination thereof. Video logs may be stored and linked to access records (for example, the associated records for a ticket). In certain embodiments, the system can deliver, upon receiving a request from a customer, a video log that includes a compilation of video for all events of physical access to that customer's set of secure containment units in a specified time period.

Cameras 160 may be connected to a network video recorder over any suitable medium, such as electrical or optical cable, or via any suitable wireless standard such as IEEE 802.11 ("Wi-Fi"), IEEE 802.16 ("WiMax"), etc. Closed circuit television cameras may be analog, digital, or combination of both. In some embodiments, cameras include an analog camera coupled to an encoder. The encoder may convert an analog signal from an analog camera to a digital signal.

In some embodiments, a network video recorder stores video data acquired from cameras 160. In some embodiments, a network video recorder compresses video data acquired by cameras 160. In some embodiments, compression is performed in accordance with a standard, such as H.264 or MPEG-4.

Video data acquired using cameras 160 may be encoded and processed. Encoding and processing of video data may be carried out in the camera devices, in the network video recorder, in another device, or combination thereof.

Figure 2:
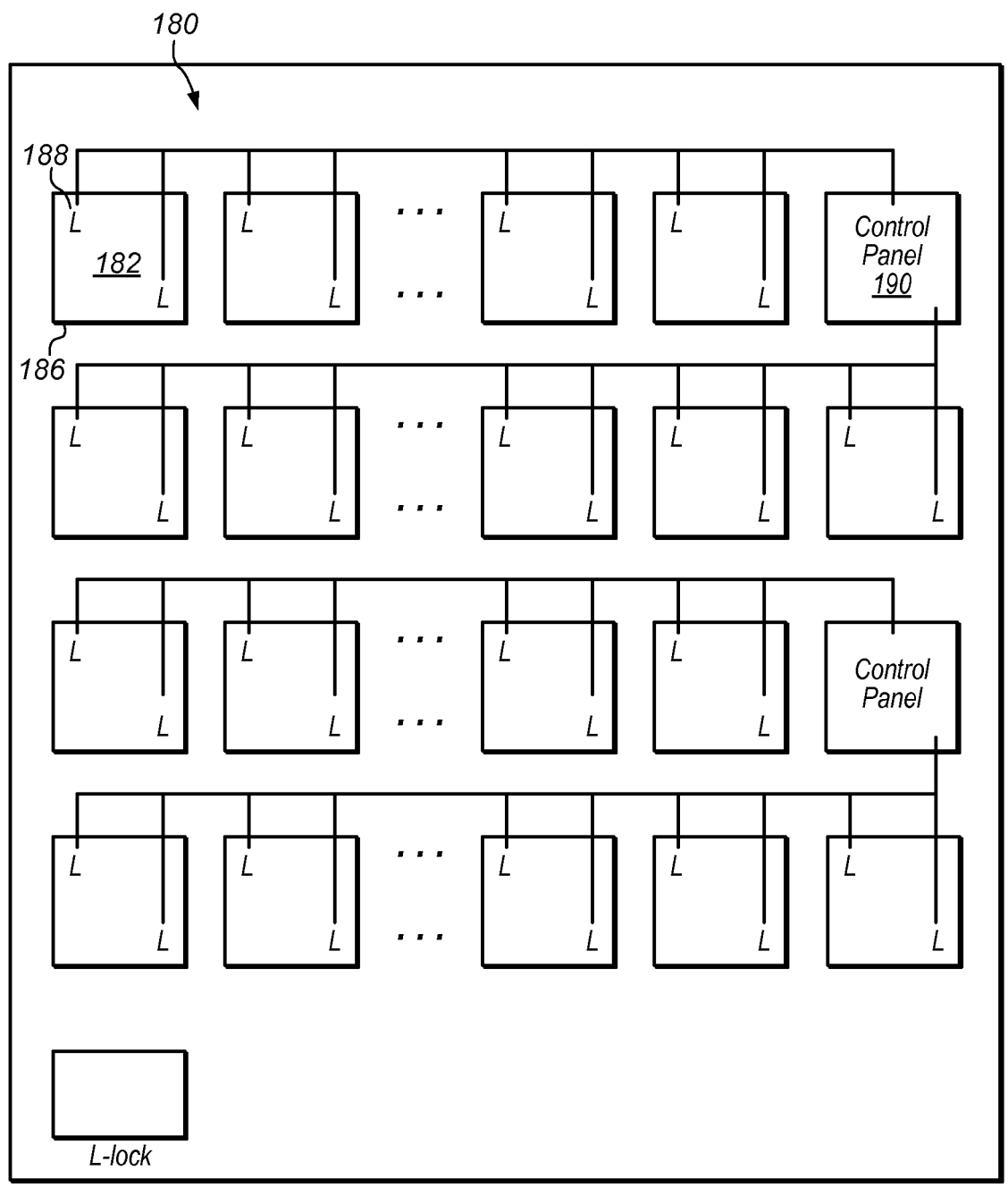
FIG. 2 is a block diagram illustrating a top view a data center for a cloud computing system with secure access to the front and back of rack-level secure containment units.

In some embodiments, access to secure containment is controlled for two or more access points of the secure containment unit. For example, secure containment unit may include a rack with front and back doors. Each door may be secured with a magnetic lock. The magnetic locks from two whole rows of racks may be connected and controlled (for example, by way of a keypad). FIG. 2 is a block diagram illustrating a top view a data center for a cloud computing system with secure access to the front and back of rack-level secure containment units. System 180 includes secure containment units 182. Each of secure containment units 182 includes rack enclosure 184, rack doors 186, and locks 188. Locks 188 may be, for example, a magnetic lock. Servers may be provided in each of secure containment units 182. Locks 188 may be coupled to a control panel 190. In some embodiments, control panel 190 is located in a control rack.

Figure 3:
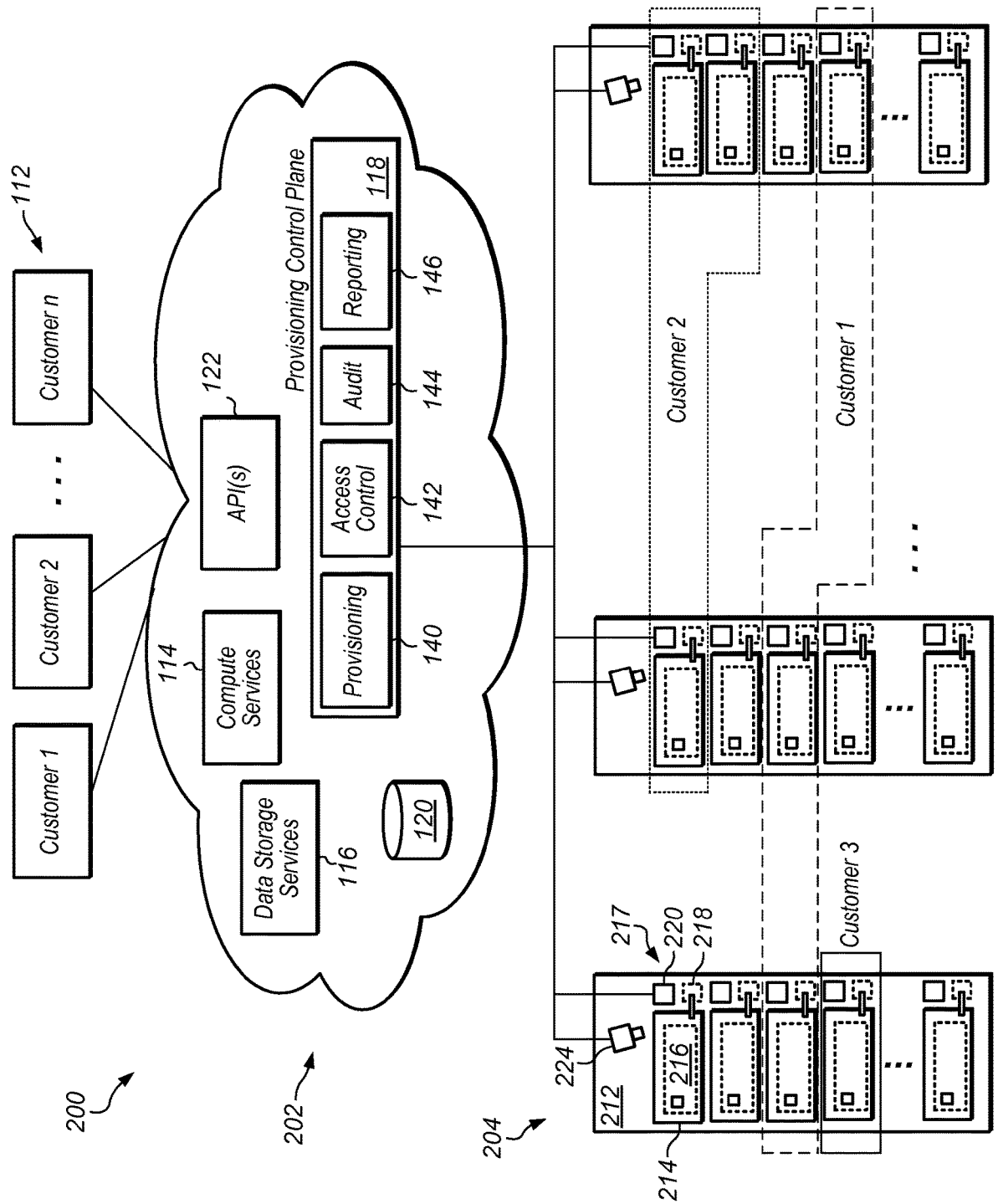
FIG. 3 illustrates one embodiment of a cloud computing system with secure containment units that hold individual computing devices.

In some embodiments, a cloud computing system includes secure containment units at a computing device level (for example, a server level). FIG. 3 illustrates one embodiment of a cloud computing system with secure containment units that hold individual computing devices (for example, individual servers). System 200 includes cloud computing system 202. Cloud computing system 202 accesses computing resources in data center 204. Data center 204 includes racks 212. Each of racks 212 encloses one or more secure containment units 214. Each of secure containment units 214 holds one of computing devices 216. Each of secure containment units 214 includes lock system 217.

Each of lock systems 217 includes lock mechanism 218 and lock control device 220. Lock control device 220 may control lock mechanism 218. Each rack 212 includes camera 224. Camera 224 may capture video of activity at the access points for each of secure containment units 214. Lock systems 217 and cameras 224 may be coupled to provisioning control plane 118.

Provisioning module 140 in provisioning control plane 118 may provision computing devices on a computing device-by-computing device basis to customers via customer systems 112. Each customer may be provisioned with computing devices one or more of secure containment units 214. For example, in FIG. 2, Customer 1 may be provisioned with a computing device in a secure containment unit 214 in each of the rack systems. Customer 2 may be provisioned with a computing device in a secure containment unit 214 in only two of the rack systems.

Access control may be maintained for each customer's computing devices in a similar manner to that described above relative to FIG. 1. Access control module 142 of provisioning control plane 118 may release lock mechanisms 218 to provide access to computing devices 216. Access may be provided in response to conditions being met. Cameras 224 may be activated to capture video of access events/attempts at secure containment units 214. Each customer may be provided with audit and reports similar to those described above relative to FIG. 1.

In some embodiments, a customer is provisioned with computing devices in secure containment units in different parts of a data center (for example, in racks in different areas, rows, or rooms in a data center.) In some embodiments, a customer is provisioned with computing devices in different data centers. Access to all of a particular customer's computing devices (whether at one data center or several data centers, for example) may be controlled and audited by a common control system.

Figure 4:
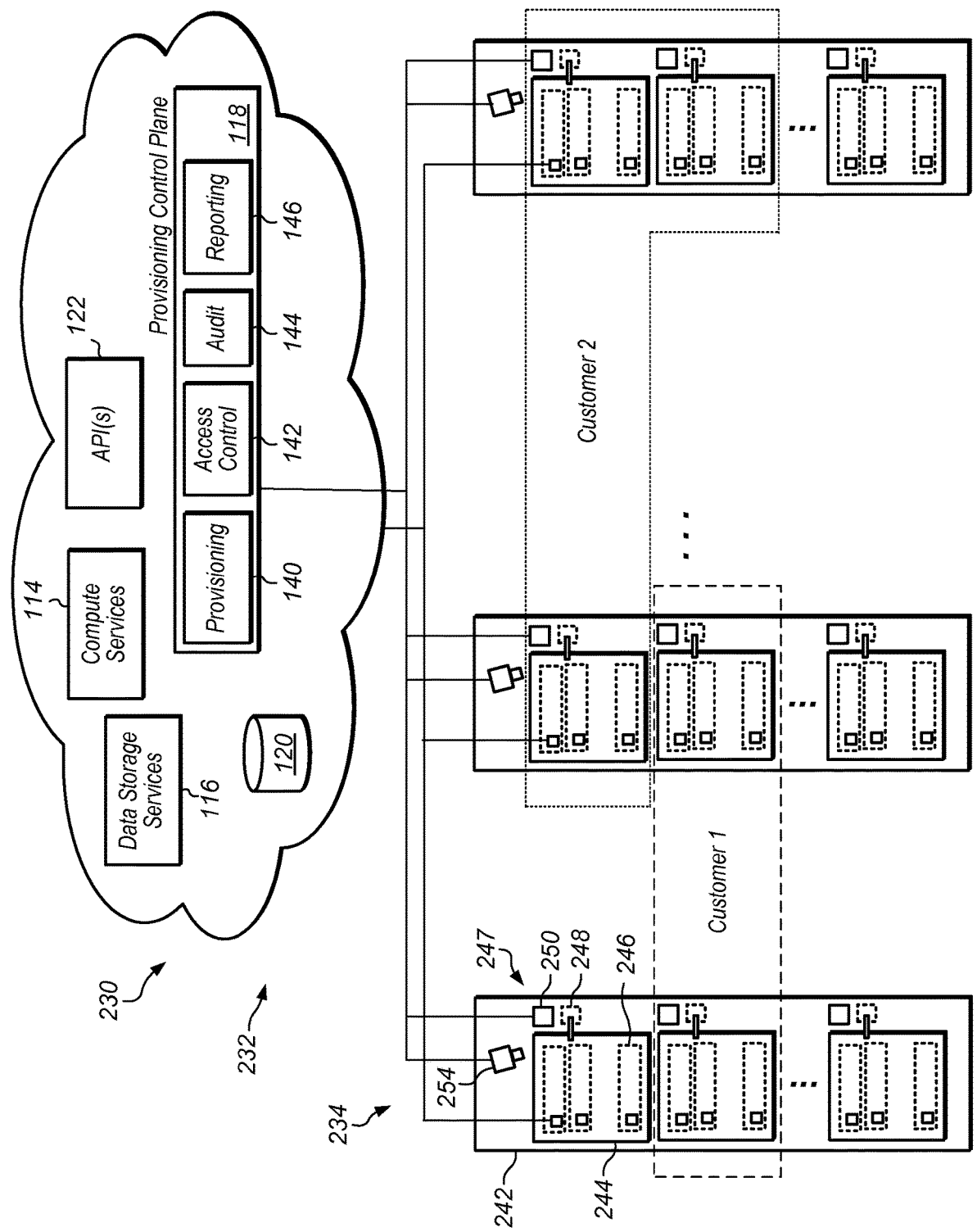
FIG. 4 illustrates one embodiment of a cloud computing system with secure containment units that hold two or more computing devices.

In some embodiments, a cloud computing system includes secure containment units with multiple computing devices at a sub-rack level. FIG. 4 illustrates one embodiment of a cloud computing system with secure containment units that hold two or more computing devices. System 230 includes cloud computing system 232. Cloud computing system 232 accesses computing resources in data center 234. Data center 234 includes racks 242. Each of racks 242 encloses one or more secure containment units 244. Each of secure containment units 244 holds two or more computing devices 246. Each of secure containment units 244 includes lock system 247.

Each of lock systems 247 includes lock mechanism 248 and lock control device 250. Lock control device 250 may control lock mechanism 248. Each rack 242 includes camera 254. Camera 254 may capture video of activity at the access points for each of secure containment units 254. Lock systems 247 and cameras 254 may be coupled to provisioning control plane 118.

Provisioning module 140 in provisioning control plane 118 may provision computing devices on a computing device-by-computing device basis to customers via customer systems 112. Each customer may be provisioned with computing devices one or more of secure containment units 244. For example, in FIG. 2, Customer 1 may be provisioned with a computing device in a secure containment unit 244 in a set of two of the rack systems. Customer 2 may be provisioned with a computing device in a secure containment unit 214 in a different set of two of the rack systems.

Access control may be maintained for each customer's computing devices in a similar manner to that described above relative to FIG. 1. Access control module 142 of provisioning control plane 118 may release lock mechanisms 248 to provide access to computing devices 246. Access may be provided in response to conditions being met. Cameras 254 may be activated to capture video of access events/attempts at secure containment units 244. Each customer may be provided with audit and reports similar to those described above relative to FIG. 1.

In some embodiments, computing assets are mapped to one or more physical locations, or to one or more secure containment units. Mapping may be based on IDs assigned to one or more assets, or sets of assets, of a system. In one embodiment, sets of computing devices operating in racks are mapped to secure containment units. For example, Servers ID0001 through 0004 in Rack 0006 in Data Center 4 may be mapped to Secure Containment Unit A000416; Servers ID0005 through 0008 in Rack 0007 of Data Center 4 may be mapped to Secure Containment Unit A000416; etc. Mapping information associating asset IDs with secure containment units may be stored for use in provisioning computing resources (for example, on a provisioning control system).

Figure 5:
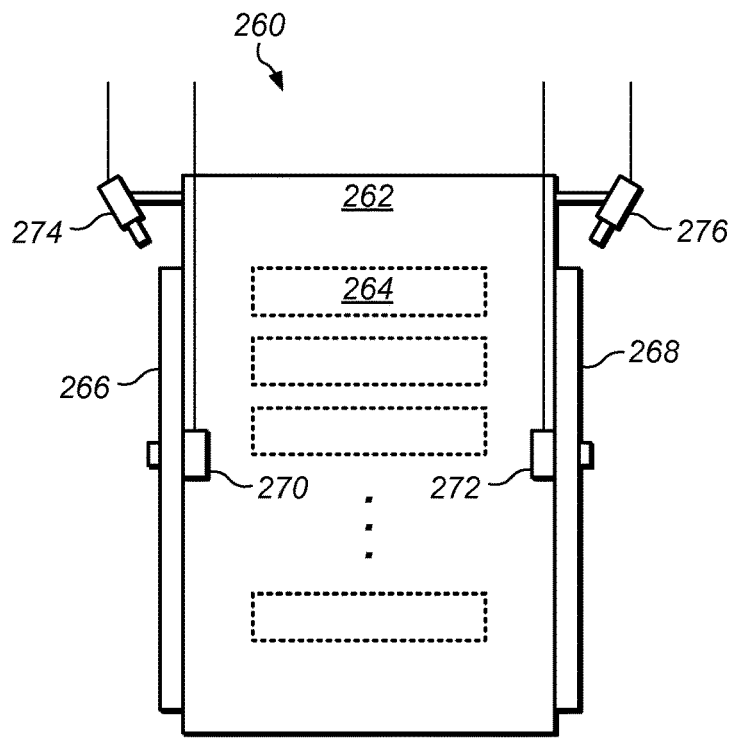
FIG. 5 illustrates one embodiment of a rack system with secure access to servers from the front and rear of the rack.

FIG. 5 illustrates one embodiment of a rack system with secure access to servers from the front and rear of the rack. Rack system 260 includes rack enclosure 262.

Computing devices 264 are mounted in rack enclosure 262. Rack system 260 may form a secure containment unit. Rack system 260 includes front door 266 and rear door 268. Access to computing devices 264 via front door 266 may be controlled by lock device 270. Access to computing devices 264 via rear door 268 may be controlled by lock device 272. Front camera 274 may be used to monitor access events through front door 266. Rear camera 276 may be used to monitor access events through rear door 268. Lock devices 270 and 272 and cameras 274 and 276 may be coupled to, and receive instructions from, a control system, such as described above relative to FIG. 1.

Figure 6:
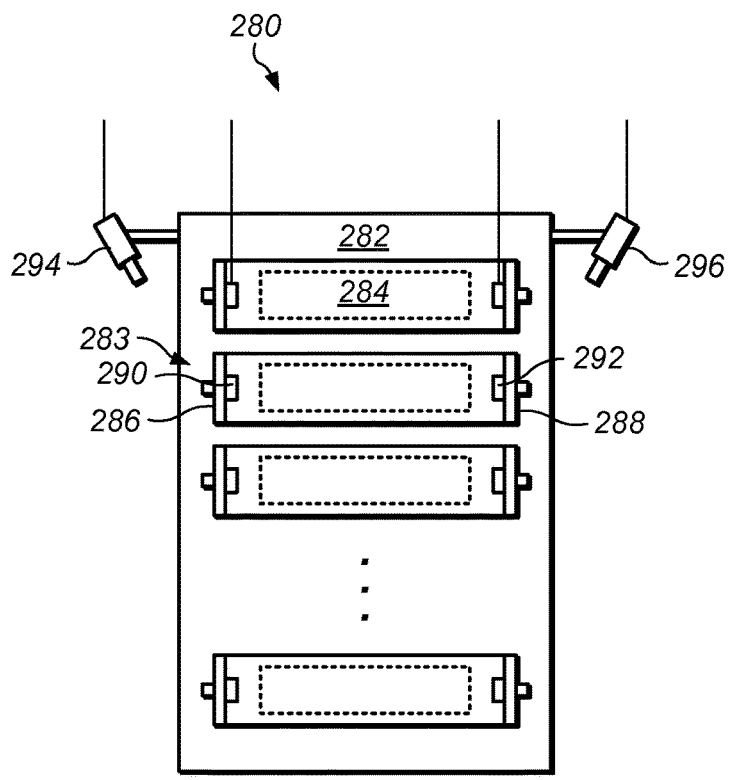
FIG. 6 illustrates one embodiment of a rack system with secure access to server-level secure containment units from the front and rear of the rack.

FIG. 6 illustrates one embodiment of a rack system with secure access to server-level secure containment units from the front and rear of the rack. Rack system 280 includes rack enclosure 282. Rack enclosure 283 encloses secure containment units 283. Each of secure containment units 283 contains one of computing devices 284. Each of secure containment units 283 includes front door 286 and rear door 288. Access to computing device 284 via front door 286 may be controlled by lock device 290. Access to computing device 284 via rear door 288 may be controlled by lock device 292. Front camera 294 may be used to monitor access events through front doors 286. Rear camera 296 may be used to monitor access events through rear door 268. Lock devices 290 and 292 and cameras 294 and 296 may be coupled to, and receive instructions from, a control system, such as described above relative to FIG. 1.

In some embodiments, a customer enables and uses a private cloud. In one embodiment, a customer performs the following actions. The customer may create a private cloud resource using an API/CLI call, or through a management console. In either case, the customer may specify details about the private cloud resource, such as which data center it would be located within, audit settings, or other information. Compute resources may be provisioned for the private cloud resource. The provisioned compute resources may include two or more secure containment units. Once the private cloud is created, compute resources may be launched and terminated.

Figure 7:
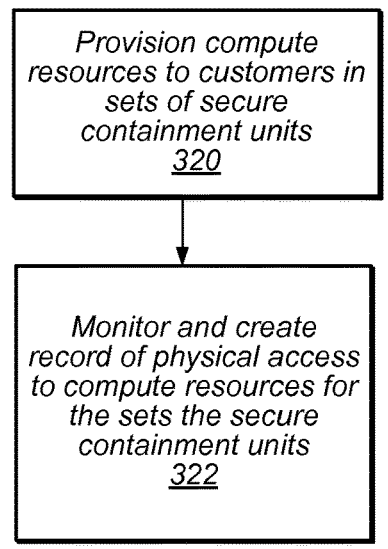
FIG. 7 illustrates one embodiment of providing computing resources to customers using secure containment units.

FIG. 7 illustrates one embodiment of providing computing resources to customers using secure containment units. At 320, a set of one or more of secure containment units each containing one or more computing devices is provisioned to two or more customers. For each customer, the computing devices in the set of two or more secure containments units may cooperate with one another to provide a computing service to the customer. In some embodiments, secure containment units in a customer's set of racks are spread over two or more racks, two or more rows of racks, or two or more data centers. In some embodiments, each secure containment unit is a sub-rack level unit.

In one embodiment, an API/CLI call includes the following parameters: the private cloud resource to provision compute resources within, the compute service instance type, and the number of instances. A customer may provision anywhere from a single instance up to the customer's account limit.

If the provisioning request is the first one within a particular private cloud resource, the following actions may be taken:
  selecting one or more racks, and assigning the selected racks to the customer.
  determining how many servers, and of what type, are required
  continuous flow processes may be used to add the required types of servers to the rack assigned to the customer,
  notifying the customer that the provisioned resources are ready to be used.

If the provisioning request is not the first one within a particular private cloud, the following actions may be taken:
  analyzing the provisioning request to determine if it can be met from capacity already in the rack (e.g. if a previous provisioning request led to left over instances in the rack).
  If the provisioning request cannot be met my existing capacity in the rack, determining how many servers, and of what type, are required.
  determining whether a new rack is required (for example, because the existing rack is full or if the newly provisioned instances are of a different family than ones that were provisioned previously.

continuous flow processes may be used to add the required types of servers to the customer's existing rack or to a new rack as described above.

notifying the customer that the provisioned resources are ready to be used.

In some embodiments, a customer creates two or more private clouds within the same region. Each private cloud may be distinct and physically isolated from the other private clouds.

In some embodiments, a private cloud customer's instances are spread out at a sub rack-level across two or more racks. For example, a customer's private cloud may include one or more server-level secure containment units in each of several racks. Spreading out servers across multiple racks may result in lower correlated failures. In some embodiments, two or more sub rack servers form a single capacity pool to manage. Servers of a particular type may be dynamically assigned to private cloud customers as they launch instances. Spare capacity may be aggregated across many private cloud customers.

In various embodiments, customers may launch instances in physical isolation (for example, rack level physical isolation) using one or more of the following options:

1. No provisioning step needed. In some embodiments, a customer launches and terminates instances without any provisioning step.

2. Provision capacity by the rack. In some embodiments, a customer provisions capacity in increments of a rack and specifies the type of capacity the customer wanted to provision. Once the customer's request is received, a rack may be built based on the customer's specifications. Once the rack is ready, the customer can launch and terminate instances within this provisioned capacity as needed. If the customer requires more capacity than was provisioned, the customer may provision more capacity in the same manner as for the customer's initial provisioning.

3. Provision capacity by instance. In some embodiments, a customer provisions capacity in increments of virtual machines. The customer may start out with an empty rack and then adds the number of servers that correspond to the number of instances the customer wants. The customer may launch and terminate instances within this provisioned capacity. The customer may subsequently provision more capacity if the customer wants to exceed what they had provisioned or change the type of capacity.

In some embodiments, adding servers to meet provisioning requests may be implemented described below: The provisioning request is analyzed to determine if it can be met from capacity already in the server (for example, if a previous provisioning request led to left over instances in the rack). If the provisioning request cannot be met by existing capacity in the server, the number and type of additional servers need how many servers of what type are required may be determined. Continuous flow data center processes may be used to add the required types of servers to the customer's rack, or to assign a new rack if the existing rack has no space.

De-provisioning may follow a similar process. The de-provisioning request may be analyzed to determine if it results in unused server capacity which may or may not occur due to the size of the de-provisioning request, the spare capacity in the rack, as well as the distribution of instances over physical hardware. If the de-provisioning results in net servers available for removal, continuous flow data center processes may be used to remove the specific servers from the customer's rack and/or remove an entire rack from a customer's private cloud.

At 322, for each customer who has been provisioned with a set of secure containment units, access to the computing devices in the customer's set of secure containment units is monitored, and a record of physical access to computing devices is created. The record may be, for example, an access log. Access to each set of secure containment units may be monitored and logged separately for each customer who is provisioned with a set of secure containment units. In addition, for each customer, access to the computing devices in the customer's set of secure containment units may be controlled.

Monitoring access may include video cameras. Controlling access may include maintaining locks on each of the secure containment units. Access may be granted (for example, a lock for a secure containment unit may be released by a control system) upon predetermined conditions being met.

In certain embodiments, customer pricing may be adjusted based on changes to a customer's usage of computing resources in secure containment units. For example, if additional computing resources are allocated within a secure containment unit, or if additional secure containment units are provisioned in response to one or more customer inputs, a customer pricing may be adjusted.

Figure 8:
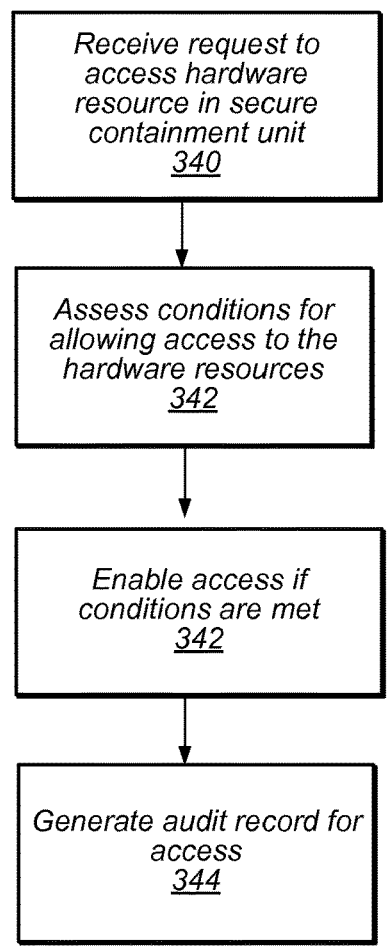
FIG. 8 illustrates one embodiment of providing access to hardware resources in secure containment units.

FIG. 8 illustrates one embodiment of providing access to hardware resources in secure containment units. At 340, a request is received to access a hardware resource in a secure containment unit. Examples of hardware resources that may be access include a computing device, power supply unit, or data storage device. The hardware resource may be provisioned to a particular customer, for example, as described above relative to FIG. 7.

At 342, one or more conditions may be assessed for allowing access. Conditions to permit access may include one or more of: authentication of the user, authorization of the user to perform a requested action; or validation that a customer-specified time window for resource access is respected.

At 344, access to the hardware resource in the secure containment unit may be enabled. Enabling access may include, releasing a lock (for example, by a control system issuing a signal a lock control device to operate a solenoid locking mechanism).

In various embodiments, some or all of the following actions may be carried out by service personnel (for example, data tech) to access a computing resource in a secure containment unit:

Create a ticket on which server/rack needs to be accessed and for what reason.

Ticket is authorized by appropriate authority.

Data tech goes to a keypad and "badges in", enters ticket number and the datacenter Rack ID of the rack that needs to be opened.

keypad system transmits a signal to the magnetic lock, which releases the door.

Once done, the data tech closes the rack door and "badges out" on the keypad.

the keypad system transmits activity record to the database server for storage.

At 346, an audit record may be generated relating to an access to the resource. To create the audit records for an end customer, a job may be run at some frequency (for example, every hour). A job may include, for example:

querying the database and obtaining all activity records since the last query.

Each record may include the datacenter rack ID that was accessed.
> querying using the datacenter rack ID and the timestamps of the records above to get all the virtual machines that were running inside that particular rack.
> storing a set of records in an appropriate database. The records may be available for access by, or reporting to, the customer to which the resource is assigned.

FIG. 9 illustrates an example of an audit report for access to computing devices in secure containment units. FIG. 10 illustrates an example of a report to a customer showing access to the customer's computing devices in secure containment units.

Example Service Provider Networking Environments

Various embodiments may be implemented in the context of a service provider that provides response management and other resources to multiple customers. A service provider may provide resources to the customers via one or more services that allow the customers to purchase, rent, or otherwise obtain instances of resources, including but not limited to computation and storage resources, implemented on devices within a service provider network or networks in one or more service provider data centers. The following section describes example service provider network environments in which above-described embodiments of the methods and apparatus for providing computing resources may be implemented. These example service provider network environments are not, however, intended to be limiting.

Figure 11:
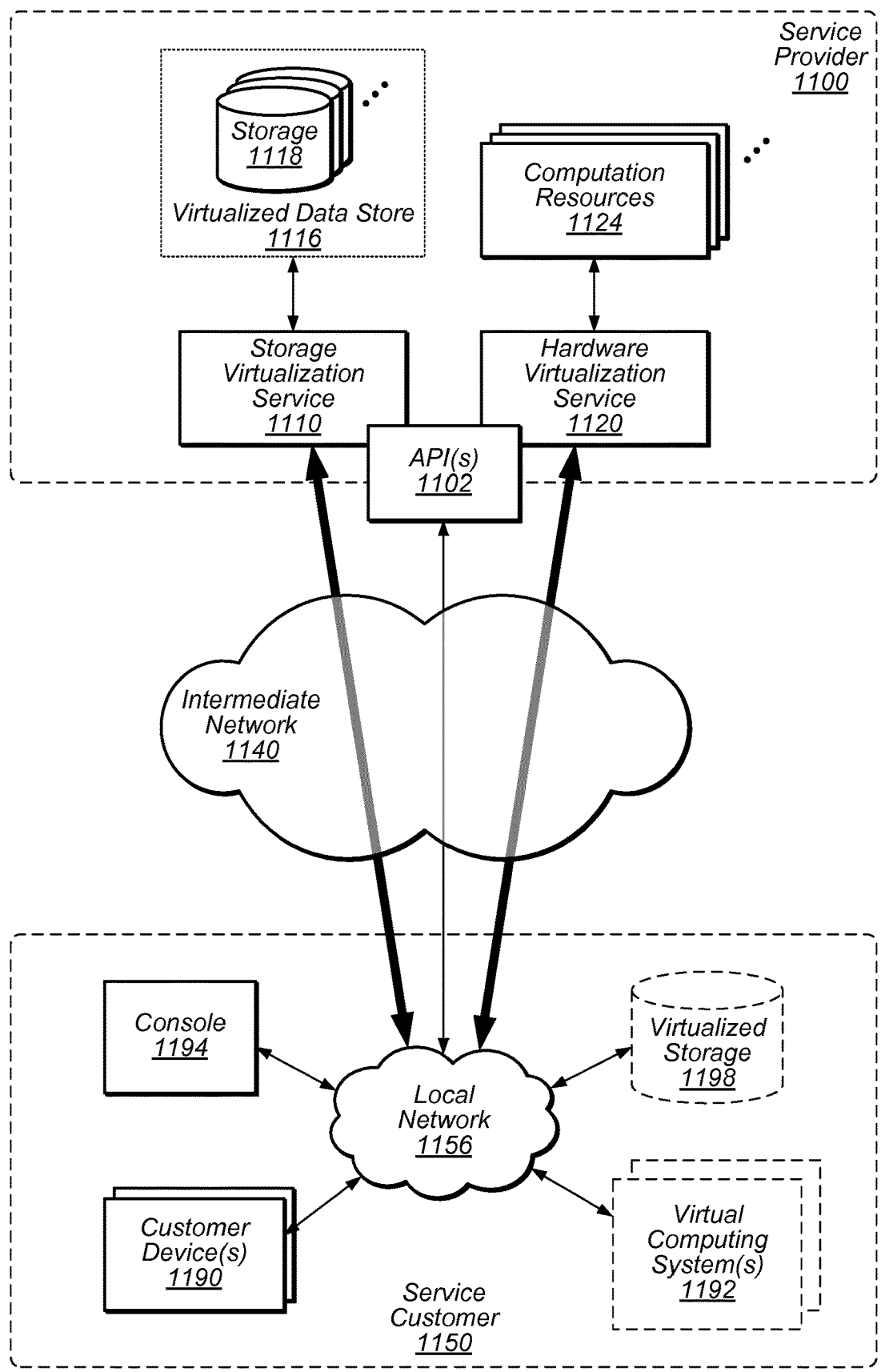
FIG. 11 is a block diagram of an example service provider that provides a storage virtualization service and a hardware virtualization service.

FIG. 11 is a block diagram of an example service provider that provides a storage virtualization service and a hardware virtualization service to customers, according to some embodiments. Hardware virtualization service 1120 provides multiple computation resources 1124 (e.g., VMs) to customers. The computation resources 1124 may, for example, be rented or leased to customers of the service provider 1100 (e.g., to service customer 1150). Each computation resource 1124 may be provided with one or more private IP addresses. A local network of service provider 1100 may be configured to route packets from the private IP addresses of the computation resources 1124 to public Internet destinations, and from public Internet sources to the computation resources 1124.

Service provider 1100 may provide a service customer 1150, for example coupled to intermediate network 1140 via local network 1156, the ability to implement virtual computing systems 1192 via hardware virtualization service 1120 coupled to intermediate network 1140 and to the local network of service provider 1100. In some embodiments, hardware virtualization service 1120 may provide one or more APIs 1102, for example a web services interface, via which a service customer 1150 may access functionality provided by the hardware virtualization service 1120, for example via a console 1194. In at least some embodiments, at the service provider 1100, each virtual computing system 1192 at customer 1150 may correspond to a computation resource 1124 that is leased, rented, or otherwise provided to service customer 1150.

From an instance of a virtual computing system 1192 and/or another customer device 1190 or console 1194, the customer may access the functionality of storage virtualization service 1110, for example via one or more APIs 1102, to access data from and store data to a virtual data store 1116 provided by the service provider 1100. In some embodiments, a virtualized data store gateway (not shown) may be provided at the service customer 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another customer device 1190, may mount and access virtual data store 1116 volumes, which appear to the user as local virtualized storage 1198.

While not shown in FIG. 11, the virtualization service(s) may also be accessed from resource instances within the service provider 1100 network via API(s) 1102. For example, a customer, appliance service provider, or other entity may access a virtualization service from within a respective private network on the service provider 1100 network via an API 1102 to request allocation of one or more resource instances within the private network or within another private network.

In at least some embodiments, a service provider may also provide, or may allow a third party to provide, load balancer services. For example, a client may launch some number of resource instances (e.g., computation resources or storage resources) in the service provider network, and instruct the load balancer service to place a load balancer in front of the resource instances. The load balancer may then distribute incoming traffic across the resource instances behind the load balancer.

Illustrative System

Figure 12:
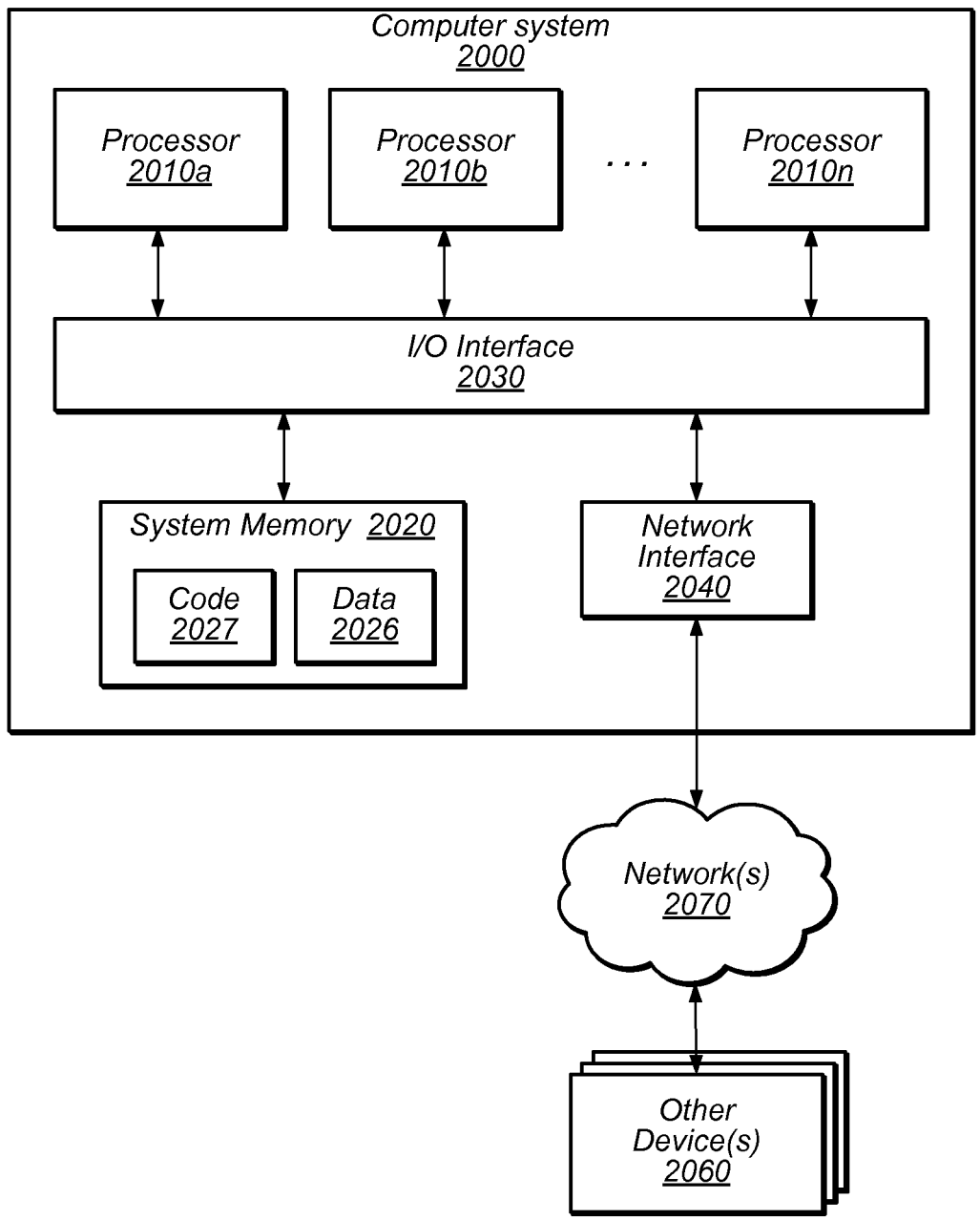
FIG. 12 illustrates one embodiment of a computer system that can be used to provision computing resources in some embodiments.

In some embodiments, a server that implements a portion or all of one or more of the technologies, including but not limited to the various service provider methods and apparatus and the methods and apparatus for remote video data storage as described herein, may include a general-purpose computer system that includes or is configured to access one or more computer-accessible media, such as computer system 2000 illustrated in FIG. 12. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for service provider methods and apparatus and the methods and apparatus for transferring data over a network, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 8, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data for implementing embodiments of methods of providing computing resources as described above relative to FIGS. 1-8. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

What is claimed is:

1. A system, comprising:
    a plurality of system computing devices configured to implement a plurality of resources of a cloud service provider network;
    a plurality of racks;
    a plurality of sub-rack level secure containment units in the plurality of racks, wherein the plurality of sub-rack level secure containment units are each configured to enclose a group of one or more system computing devices of the plurality of system computing devices, wherein respective groups of system computing devices enclosed in respective ones of the sub-rack level secure containment units are physically isolated from other system computing devices of the plurality of system computing devices, wherein at least one particular rack of the plurality of racks holds two or more of the sub-rack level secure containment units; and
    one or more computing devices configured to implement a provisioning control system for the cloud service provider network, wherein the provisioning control system comprises:
        a provisioning module configured to:
            receive, from the cloud service customer, via an application programmatic interface (API), a command line interface, or a management console to the cloud service provider network, a request for a private cloud to be created for the cloud service customer, wherein the private cloud comprises restricted physical access cloud resources, wherein the request specifies a number of restricted physical access cloud resources to be provisioned for the private cloud and conditions for physical access to the restricted physical access cloud resources to be provisioned for the private cloud; and
        in response to the request:
            select one or more of the plurality of racks that comprises sub-rack level secure containment units to be assigned to the cloud service customer;
            determine, based on the request, a number of the system computing devices to be installed in a first sub-rack level secure containment unit of the selected one or more racks;
            determine, based on the request, a number of the system computing devices to be installed in a second sub-rack level secure containment unit of the selected one or more racks;
cause the determined numbers of the system computing devices to be installed in the first and second sub-rack level secure containment units of the selected one or more racks;
provision the private cloud comprising the restricted physical access cloud resources to the cloud service customer, wherein the restricted physical access cloud resources comprise:
a first group of the system computing devices installed in the first sub-rack level secure containment unit singly dedicated for use by the cloud service customer; and
a second group of the system computing devices installed in the second sub-rack level secure containment unit singly dedicated for use by the cloud service customer,
wherein the cloud service customer is enabled to:
launch computing instances in the cloud service customer's private cloud using the first and second group of system computing devices singly dedicated for use by the cloud service customer; and
perform computing operations using the computing instances launched in the cloud service customer's private cloud; and
an access control module configured to:
send to the cloud service customer, in response to receiving a request for access to one or more of the secure containment units in a set of the cloud service customer's secure containment units, a request for approval from the cloud service customer to access one or more of the secure containment units in the cloud service customer's set of secure containment units;
receive from the cloud service customer an approval message in response to the request for approval; and
release, in response to receiving the approval from the cloud service customer, a lock on at least one of the secure containment units in the cloud service customer's set of secure containment units,
wherein the access control module is configured to gate access to the cloud service customer's set of secure containment units such that approval from the cloud service customer is required before the access control module grants access to one or more of the secure containment units of the cloud service customer's set of secure containment units.

2. The system of claim 1, further comprising:
a lock on each of the re sub-rack level secure containment units in the cloud service customer's set of secure containment units,
wherein each of the locks is coupled to the access control module of the provisioning control system, and wherein the access control module is configured to:
operate the locks to control physical access to each respective group of system computing devices in each of the sub-rack level secure containment units in the cloud service customer's set of secure containment units and
for each of the locks, release the lock if the specified conditions for physical access to the restricted physical access cloud resources are met.

3. The system of claim 2, wherein the specified conditions for physical access to the restricted physical access cloud resources included in the request are defined by the cloud service customer.

4. The system of claim 1, wherein the provisioning control system further comprises:
an audit module configured to perform, for each of the cloud service customer's set of sub-rack level secure containment units, an audit of physical access to the computing devices in the respective sub-rack level secure containment units.

5. The system of claim 1, wherein the provisioning control system further comprises:
a reporting module configured to report, to the cloud service customer, occurrences of physical access to the system computing devices in the cloud service customer's set of sub-rack level secure containment units.

6. The system of claim 1, wherein at least one of the sub-rack level secure containment units in the cloud service customer's set of sub rack-level secure containment units is in a different rack than at least one other sub-rack level secure containment unit in the cloud service customer's set of sub rack-level secure containment units.

7. The system of claim 1, wherein at least one of the sub-rack level secure containment units in the cloud service customer's set of sub rack-level secure containment units is in a different data center than at least one other sub-rack level containment unit in the cloud customer's set of sub rack-level secure containment units.

8. A system, comprising:
a plurality of system computing devices configured to implement a plurality of resources of a cloud service provider network;
a plurality of racks;
a plurality of secure containment units, wherein the plurality of secure containment units are each configured to enclose a group of two or more system computing devices of the plurality of system computing devices, wherein respective groups of system computing devices enclosed in respective ones of the secure containment units are physically isolated from other system computing devices in a same rack as the group of system computing devices; and
one or more computing devices configured to implement a provisioning control system for the cloud service provider network, wherein the provisioning control system comprises:
a provisioning module configured to, for each of two or more cloud service customers of the cloud service provider network:
receive, from the respective cloud service customer, via an application programmatic interface (API), a command line interface, or a management console to the cloud service provider network, a request for a private cloud to be created for the respective cloud service customer, wherein the private cloud comprises restricted physical access cloud resources, wherein the request specifies a number of restricted physical access cloud resources to be provisioned for the private cloud and conditions for physical access to the restricted physical access cloud resources to be provisioned for the private cloud; and
in response to the request:
select, for the respective cloud service customer, one or more of the plurality of racks that comprises sub-rack level secure containment units to be assigned to the respective cloud service customer;
determine, for the respective cloud service customer, based on the request, a number of system computing devices to be installed in a first sub-rack level secure containment unit of the selected one or more racks;

determine, for the respective cloud service customer, based on the request, a number of system computing devices to be installed in a second sub-rack level secure containment unit of the selected one or more racks;

cause, for the respective cloud service customer, the determined numbers of system computing devices to be installed in the first and second sub-rack level secure containment units of the selected one or more racks;

provision the restricted physical access cloud resources to the respective cloud service customer, wherein the restricted physical access cloud resources comprise:
- a first group of the system computing devices installed in the first secure containment unit singly dedicated for use by the respective cloud service customer; and
- a second group of the system computing devices installed in the second sub-rack level secure containment unit singly dedicated for use by the respective cloud service customer;

wherein at least one secure containment unit in a set of secure containment units used for the respective cloud service customer's private cloud is in a different rack than at least one other secure containment unit in the set;

wherein the respective cloud service customer is enabled to:
- launch computing instances in the respective cloud service customer's private cloud using the first and second group of system computing devices singly dedicated for use by the respective cloud service customer; and
- perform computing operations using the computing instances launched in the respective cloud service customer's private cloud; and an access control module configured to:
- send to the respective cloud service customer, in response to receiving a request for access to one or more of the secure containment units in the a set of secure containment units of the respective cloud service customer, a request for approval from the respective cloud service customer to access one or more of the secure containment units in the respective cloud service customer's set of secure containment units;
- receive from the respective cloud service customer an approval message in response to the request for approval; and
- release, in response to receiving the approval from the respective cloud service customer, a lock on at least one of the secure containment units in the respective cloud service customer's set of secure containment units, wherein the access control module is configured to gate access to the respective cloud service customer's set of secure containment units such that approval from the respective cloud service customer is required before the access control module grants access to one or more of the secure containment units of the respective cloud service customer's set of secure containment units.

9. The system of claim 8, wherein the provisioning control system further comprises:
an audit module configured to perform, for each of the cloud service customer's set of secure containment units, an audit of physical access to the system computing devices in the cloud service customer's set of secure containment units.

10. The system of claim 8, wherein the provisioning control system further comprises:
a reporting module configured to report, to the cloud service customer, physical access to the system computing devices in the cloud service customer's set of secure containment units.

11. The system of claim 8, wherein, at least one of one of the secure containment units in the set of secure containment units used for the respective cloud service customer's private cloud is in a different data center than at least one other secure containment unit in set of secure containment units used for the respective cloud service customer's private cloud.

12. The system of claim 8, further comprising a lock on each of the secure containment units in the cloud service customer's set of secure containment units,
wherein each of the locks is coupled to the access control module of the provisioning control system, wherein the access control module is configured to:
- operate the locks to control physical access to the group of system computing devices in each secure containment unit in the cloud service customer's set of secure containment units; and
- for each of at least one of the locks, release the lock if one or more of the conditions for physical access to restricted physical access cloud resources are met.

13. The system of claim 12, wherein the one or more conditions for physical access to the restricted physical access cloud resources comprise access criteria defined by the cloud service customer.

14. The system of claim 12, wherein the one or more of the conditions for physical access to restricted physical access cloud resources comprises a specification of an authorized time window for accessing system computing devices in the cloud service customer's set of secure containment units, wherein the access control module of the provisioning control system is configured to verify that a current time is within the authorized time window specified by the cloud service customer as a condition for releasing the lock.

15. The system of claim 8, further comprising, for at least one of the cloud service customer's sets of secure containment units, a set of one or more cameras coupled to the access control module, wherein the set of one or more cameras is configured to monitor physical access to the secure containment units in the cloud service customer's set of secure containment units.

16. The system of claim 15, wherein the provisioning control system further comprises:
an audit module, wherein, for the at least one of the cloud service customer's sets of secure containment units, the audit module is configured to associate video for each access event acquired by at least one of the cameras with a request for physical access for the access event.

17. The system of claim 15, wherein, for the cloud service customer's set of the secure containment units, the audit module is configured to compile a video log including all of events of physical access to the cloud service customer's set of secure containment units within a particular time period.

18. The system of claim 8, wherein the provisioning control system is configured to, for at least one cloud service customer, increase or decrease the number of secure containment units used for the cloud service customer's private cloud in response to one or more customer inputs.

19. The system of claim 8, wherein at least one of the secure containment units is a sub-rack level secure containment unit, wherein at least one of the racks includes two or more sub-rack level containment units.

20. The system of claim 8, wherein the provisioning control system is configured to adjust pricing associated with computer resources that comprise the one or more system computing devices in the set of secure containment units in response to one or more customer inputs.

21. A method of providing cloud resources of a cloud service provider network to cloud service customers, comprising:
receiving, via an interface of the cloud service provider network, from two or more cloud service customers, two or more respective requests for a private cloud to be created for the respective cloud service customer, wherein the private cloud comprises cloud resources of the cloud service provider network with restricted physical access, wherein the two or more respective requests each specify a number of restricted physical access cloud resources to be provisioned for the respective cloud service customer's private cloud and conditions for physical access to the requested restricted physical access cloud resources to be provisioned for the respective cloud service customer's private cloud;
in response to receiving the two or more respective requests, performing for each request:
selecting one or more racks that comprises sub-rack level secure containment units to be assigned to a respective one of the two or more cloud service customers;
determining, for the respective cloud service customer, based on the respective request, a number of system computing devices to be installed in a first sub- rack level secure containment unit of the selected one or more racks;
determining, for the respective cloud service customer, based on the respective request, a number of system computing devices to be installed in a second sub-rack level secure containment unit of the selected one or more racks;
causing, for the respective cloud service customer, the determined numbers of system computing devices to be installed in the first and second sub-rack level secure containment units of the selected one or more racks;
provisioning, to each respective cloud service customer of the two or more cloud service customers, cloud resources of the cloud service provider network implemented on:
a first group of the system computing devices the first secure containment unit singly dedicated for use by the respective cloud service customer; and
a second group of the system computing devices installed in the second sub-rack level secure containment unit singly dedicated for use by the respective cloud service customer,
wherein at least one of the first secure containment unit and the additional sub-rack level secure containment units for the respective cloud service customer are in different racks, and wherein respective ones of the secure containment units are physically isolated from other system computing devices in a same rack as the respective ones of the secure containment units;
wherein each of the respective cloud service customers is enabled to:
launch computing instances in the respective cloud service customer's private cloud using the first and second group of system computing devices singly dedicated for use by the respective cloud service customer; and
perform computing operations using the computing instances launched in the respective cloud service customer's private cloud;
wherein at least one of the conditions for physical access to the restricted physical access resources included in a given one the requests from the two or more cloud service customer is access gated by approval from the respective cloud service customer,
the method further comprising:
sending to the respective cloud service customer, in response to receiving a request for access to one or more of the secure containment units in a set of secure containment units of the respective cloud service customer, a request for approval from the respective cloud service customer to access one or more of the secure containment units in the respective cloud service customer's set of secure containment units;
receiving from the respective cloud service customer an approval message in response to the request; and
releasing, in response to receiving the approval from the respective cloud service customer, a lock on at least one of the secure containment units in the respective cloud service customer's set of secure containment units,
wherein an access control module of the provisioning control system is configured to gate access to the respective cloud service customer's set of secure containment units such that approval from the respective cloud service customer is required before the access control module of the provisioning control system grants access to one or more of the secure containment units of the respective cloud service customer's set of secure containment units.

22. The method of claim 21, further comprising performing, for each cloud service customer's set of secure containment units, an audit of physical access to the system computing devices in the set of secure containment units.

23. The method of claim 21, further comprising reporting to at least one cloud service customer instances of physical access to the system computing devices in the at least on cloud service customer's set of secure containment units.

24. The method of claim 21, wherein the provisioning control system is configured to, for at least one cloud service customer, increase or decrease the number of secure containment units in the at least one cloud service customer's private cloud in response to one or more customer inputs.

25. A system for controlling access to resources of a cloud service provider network, comprising:
a plurality of secure containment units in a plurality of racks in a data center, wherein respective ones of the secure containment units comprise system computing devices of the cloud service provider network physically isolated from other system computing devices in a same rack as the respective secure containment unit; and
a secure containment unit access control system of the cloud service provider network, comprising:
a processor;
a memory coupled to the processor and configured to store program instructions executable by the processor to implement:
receiving, via an interface of the service provider network, from two or more cloud service customers of the cloud service provider network, two or more requests for respective private cloud to be created for the respective cloud service customers, wherein each of the respective private clouds comprise cloud resources of the cloud service provider network with restricted physical access, wherein the two or more requests specify a number of restricted physical access cloud resources to be provisioned for the respective private cloud and conditions for physical access to restricted physical access cloud resources to be provisioned for the respective private cloud;

selecting, for each of the two or more cloud service customers, one or more of the plurality of racks that comprises sub-rack level secure containment units to be separately assigned to a respective one of the two or more cloud service customers;

determining, for each of the two or more cloud service customers, based on the respective requests, a number of system computing devices to be installed in a first sub-rack level secure containment unit of the selected one or more racks;

determining, for each of the two or more cloud service customers, based on the request, a number of system computing devices to be installed in a second sub-rack level secure containment unit of the selected one or more racks;

causing, for each of the two or more cloud service customers, the determined numbers of system computing devices to be installed in the first and second sub-rack level secure containment units of the selected one or more racks;

provisioning cloud resources of the service provider network to each of the respective cloud service customers, wherein, for each cloud service customer, the cloud resources are implemented on:
  a first group of the system computing devices in the first secure containment unit singly dedicated for use by the respective cloud service customer; and
  a second group of the system computing devices installed in the second secure containment unit singly dedicated for use by the respective cloud service customer;
  wherein each of the respective cloud service customers is enabled to:
    launch computing instances in the respective cloud service customer's private cloud using the first and second group of system computing devices singly dedicated for use by the respective cloud service customer; and
    perform computing operations using the computing instances launched in the respective cloud service customer's private cloud;

controlling, for each of at least two of the customers, physical access to the system computing devices in a set of secure containment units of the respective cloud service customer in accordance with the respective conditions for physical access to the restricted physical access cloud resources included in each of the two or more requests from the two or more cloud service customers, wherein at least one of the conditions for physical access to the restricted physical access cloud resources included in at least one of the two or more requests from at least one of the two or more cloud service customers is access gated by approval from the at least one cloud service customer, and wherein the program instructions are further executable by the processor to implement:
  sending to the at least one cloud service customer in response to receiving a request for access to one or more of the secure containment units in the at least one cloud service customer's set of secure containment units, a request for approval from the at least one cloud service customer to access one or more of the secure containment units in the at least one cloud service customer's set of secure containment units;
  receiving from the at least one cloud service customer an approval message in response to the request for approval; and
  releasing, in response to receiving the approval from the at least one cloud service customer, a lock on at least one of the secure containment units in the at least one cloud service customer's set of secure containment units, wherein the secure containment unit access control system is configured to gate access to the at least one cloud service customer's set of secure containment units such that approval from the at least one cloud service customer is required before the secure containment unit access control system grants access to one or more of the secure containment units of the at least one cloud service customer's set of secure containment units.

26. The system of claim 25, wherein controlling access to system computing devices in the plurality of secure containment units comprises authenticating one or more persons attempting to access at least one of the system computing devices in at least one of the secure containment units.

27. The system of claim 25, wherein controlling access to system resources in the plurality of secure containment units comprises releasing a lock on at least one of the secure containment units in response to verifying authorized access by one or more persons.

* * * * *